United States Patent
Jo et al.

(10) Patent No.: US 12,086,106 B2
(45) Date of Patent: Sep. 10, 2024

(54) METHOD AND APPARATUS FOR PROVIDING METADATA SHARING SERVICE

(71) Applicant: SAMSUNG SDS CO., LTD., Seoul (KR)

(72) Inventors: Jun Deok Jo, Seoul (KR); Sang Uk Han, Seoul (KR); Hyo Jin Kim, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 219 days.

(21) Appl. No.: 17/512,973

(22) Filed: Oct. 28, 2021

(65) Prior Publication Data

US 2022/0129419 A1 Apr. 28, 2022

(30) Foreign Application Priority Data

Oct. 28, 2020 (KR) .......................... 10-2020-0141434

(51) Int. Cl.
*G06F 16/176* (2019.01)
*G06F 16/16* (2019.01)
*G06F 16/182* (2019.01)

(52) U.S. Cl.
CPC .......... *G06F 16/176* (2019.01); *G06F 16/164* (2019.01); *G06F 16/183* (2019.01)

(58) Field of Classification Search
CPC ..... G06F 16/176; G06F 16/164; G06F 16/183
See application file for complete search history.

(56) References Cited

U.S. PATENT DOCUMENTS

| 8,090,744 B1* | 1/2012 | Baird | G06F 16/188 |
| | | | 707/791 |
| 2010/0049718 A1* | 2/2010 | Aronovich | G06F 12/0802 |
| | | | 707/607 |
| 2017/0371895 A1 | 12/2017 | Shaw, Jr. et al. | |
| 2018/0232430 A1* | 8/2018 | Zhu | G06F 16/278 |
| 2020/0026868 A1* | 1/2020 | Flowers | G06F 3/0655 |

FOREIGN PATENT DOCUMENTS

| CN | 101834937 A | * | 9/2010 |
| CN | 105227661 B | | 4/2019 |
| EP | 1 635 244 A2 | | 3/2006 |
| JP | 2004-078918 A | | 3/2004 |
| JP | 2007004604 A | * | 1/2007 |
| KR | 10-0740682 B1 | | 7/2007 |
| KR | 10-1544356 B1 | | 8/2015 |

* cited by examiner

*Primary Examiner* — Hosain T Alam
*Assistant Examiner* — Anthony G Gemignani
(74) *Attorney, Agent, or Firm* — Sughrue Mion, PLLC

(57) ABSTRACT

A method for providing metadata sharing service may include obtaining a sharing event for a predetermined range path based on a current location of a first target object, determining whether a second original name of a second target object previously registered with a name duplicating with a first original name of the first target object according to the sharing event exists in a sharing table, generating and registering a first unique name different from a second unique name for the second original name of the second target object in the sharing table in response to the existence of a second original name previously registered with a name duplicating with the first original name, and sharing a predetermined range path based on a current location of a first target object of the first unique name according to the sharing event through a virtual drive.

19 Claims, 12 Drawing Sheets

FIG. 4

| IDENTIFICATION ID | ORIGINAL NAME | UNIQUE NAME | NUMBER OF DUPLICATE CASE |
|---|---|---|---|
| 1111 | DESIGN DOCUMENT | DESIGN DOCUMENT | 1 |
| 1112 | DESIGN DOCUMENT | DESIGN DOCUMENT (2) | 2 |
| 1234 | DESIGN DOCUMENT | DESIGN DOCUMENT (3) | 3 |
| 1245 | COMPANY YEAR-END PARTY2020 | COMPANY YEAR-END PARTY2020 | 1 |
| 1311 | MEETING MINUTESNC12.docx | MEETING MINUTESNC12.docx | 1 |
| 1312 | TF WEEKLY REPORT.docx | TF WEEKLY REPORT.docx | 1 |
| 1333 | TF WEEKLY REPORT.docx | TF WEEKLY REPORT (2).docx | 2 |

FIG. 5

| NAME | MODIFIED DATE | TYPE | SIZE |
|---|---|---|---|
| MY PC > Share Service (Z:) > SHARED FILES | | | |
| 1— DESIGN DOCUMENT (2) | 2020-01-15 ... | FILE FOLDER | |
| 2— DESIGN DOCUMENT (3) | 2020-04-03 ... | FILE FOLDER | |
| 3— COMPANY YEAR-END PARTY20202 | 2020-06-29 ... | FILE FOLDER | |
| 4— TF WEEKLY REPORT (2).docx | 2020-04-02 ... | Microsoft Word ... | 18KB |

| NUMBER | UNIQUE NAME | SUBFOLDER AND FILE PATH | SERVER REQUEST | FULL PATH VALUE REQUESTED TO SERVER |
|---|---|---|---|---|
| 1 | DESIGN DOCUMENT (2) | - | DELETE | DESIGN DOCUMENT (2) |
| 2 | DESIGN DOCUMENT (3) | MOBILE/IPHONE/USER REGISTRATION | RENAME | DESIGN DOCUMENT (3)/MOBILE/IPHONE/USER REGISTRATION |
| 3 | COMPANY YEAR-END PARTY2020 | TF MEMBER/CONTACT.XLSX | SUB-LIST INQUIRY | COMPANY YEAR-END PARTY2020/TF MEMBER/CONTACT.XLSX |
| 4 | TF WEEKLY REPORT (2).docx | - | OPEN | TF WEEKLY REPORT (2).docx |

310

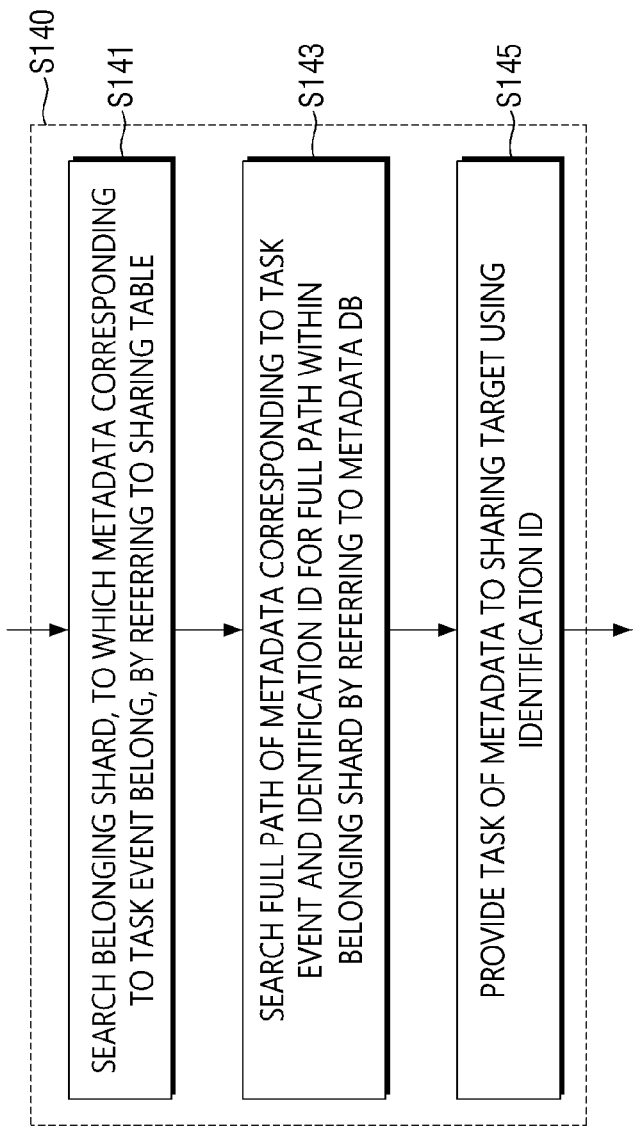

METHOD AND APPARATUS FOR PROVIDING METADATA SHARING SERVICE

CROSS REFERENCE TO RELATED APPLICATIONS AND CLAIM OF PRIORITY

This application claims the benefit of Korean Patent Application No. 10-2020-0141434, filed on Oct. 28, 2020, in the Korean Intellectual Property Office, the disclosure of which is incorporated herein by reference in its entirety.

BACKGROUND

1. Field

The present invention relates to a method and apparatus for providing a metadata sharing service. More specifically, it relates to providing a method and apparatus for providing a metadata sharing service capable of preventing the disclosure of unnecessary information and reducing the time complexity of searching for a shared folder and file by sharing a subfolder or a file existing at a subfolder level without sharing the upper folder of the target object to be shared in a virtual drive environment.

2. Description of the Related Art

Access to a file is mainly performed in two ways. First, it is divided into a name space and a virtual drive according to the way the file is read. In the case of the virtual drive method, since the explorer UI is used, there is no need to implement a separate UI to display folders and files on the server to the user, and it is provided in the same interface as the explorer, so it is convenient to use. However, a problem occurs when a folder or file existing in an arbitrary location registered on the server is shared and accessed and used through the explorer UI. The reason is that an OS such as Windows distinguishes the target folder and file by the full path value, so in the virtual drive method using the explorer UI provided by the OS, when a folder or file on the server is displayed on the client, the path to each folder or file should be displayed as a unique path. Therefore, in the virtual drive method, there is a restriction in that a folder or file with the same name cannot exist in a lower path of the same upper folder, and the names of shared folders and files displayed in one place after being shared by multiple users should not be duplicated.

In order to solve the above restriction, shared folders and files can be displayed to the user in the virtual drive environment using the following methods, but each method causes an additional problem.

First, when sharing folders and files, even if only some of the folders want to be shared, since the explorer UI that distinguishes folders and files by the full path value is used, not only the folder but also all the upper folder paths for searching the folder are shared. However, when sharing folders and files, they should be clearly distinguished from other folders and files existing on the server. This is a similar concept in that if only the street address is given when giving an address to another person, it is not possible to know to which city or district the street address belongs with this street address alone, and others cannot find it with that street address. So, the full address is needed to provide to another person. As shown in a of FIG. 1, even in a situation where only the design book, and the July 2020 and August 2020 folders want to be shared, all folders in the intermediate path between the root folder and the actually shared folder are displayed unnecessarily, so that the client can access the target folders and files on the server without error. However, since other upper folders that are not permitted to be shared with the shared user are exposed together, if the folder name contains content requiring security, such information is disclosed to the sharers.

Second, in order to solve the above problem, there is a method of sharing only the last subfolder as shown in b of FIG. 1. In this case, the security problem of exposing the upper folder name, which is a problem that occurred in the first proposed method as described above, is solved, but when a folder with the same name as the design document is shared, the upper path cannot be known. So, it is necessary to check and find all the "design document" folders registered on the server from among the folders of all users in order to access "design document," which consumes time and money, and if there are multiple folders with the same name, it is not possible to know which folder is the correct one among them.

In particular, in the case above, when metadata is stored in shards that are distributed and managed across multiple servers, since each shard should be accessed and searched for the folder in order to search in which shard the metadata is stored, the speed corresponding to (number of shards*search time) may decrease, and in addition, there was a waste of resources to search for unnecessary shards.

Therefore, there is a need to develop a method for quickly accessing a shared file without sharing the upper folder of the shared folder for security reasons.

SUMMARY

The technical problem to be solved by the present invention is to provide a method and apparatus for providing a metadata sharing service capable of sharing metadata without disclosing an upper path in a virtual drive environment.

Another technical problem to be solved by the present invention is to provide a method and apparatus for providing a metadata sharing service that can avoid duplication of names of a subfolder when the upper path of metadata is not disclosed.

Another technical problem to be solved by the present invention is to provide a method and apparatus for providing metadata sharing service, in which even if only a lower path is shared, it is possible to easily search to which shard the folder belongs, in which task was performed when performing the task later, and time and cost can be reduced.

Another technical problem to be solved by the present invention is to provide a method and apparatus for providing metadata sharing service, in which even if sharing only a lower path, it is possible to easily search to which shard the folder belongs, in which a task was performed when performing the task later, and since the sharing table and the metadata DB are used, the task can be completed with only two constant time complexity, which has the advantage of reducing time and cost.

The technical problems of the present invention are not limited to the technical problems mentioned above, and other technical problems not mentioned will be clearly understood by those skilled in the art from the following description.

The method comprises obtaining a sharing event for a predetermined range path based on a current location of a first target object, determining whether a second original name of a second target object previously registered with a name duplicating with a first original name of the first target object according to the sharing event exists in a sharing table by using the sharing table for managing a sharing target object, generating and registering a first unique name different from a second unique name for the second original name of the second target object in the sharing table in response to the existence of a second original name previously registered with a name duplicating with the first original name, and sharing a predetermined range path based on a current location of a first target object of the first unique name according to the sharing event through a virtual drive.

An apparatus for providing a metadata sharing service comprising, a processor, a network interface, a memory executed by the processor for loading a computer program, and a storage for storing the computer program, wherein the computer program comprises, an instruction for obtaining a share event for a predetermined range path based on a current location of a first target object, an instruction for determining whether a second original name of a second target object previously registered with a name duplicating with a first original name of the first target object according to the sharing event exists in a sharing table by using the sharing table for managing a sharing target object, an instruction for generating and registering a first unique name different from a second unique name for the second original name of the second target object in the sharing table in response to the existence of a second original name previously registered with a name duplicating with the first original name; and an instruction for sharing a predetermined range path based on a current location of a first target object of the first unique name according to the sharing event through a virtual drive.

BRIEF DESCRIPTION OF THE DRAWINGS

These and/or other aspects will become apparent and more readily appreciated from the following description of the embodiments, taken in conjunction with the accompanying drawings in which:

FIG. 4 is a diagram for describing an example of a sharing table, in which various types of metadata information are recorded, in order to provide a metadata sharing service;

FIG. 5 is a diagram for describing an example of metadata received by a sharing target from a sharing provider through a virtual drive;

FIG. 6 is a diagram for describing an example of task event information, in which a sharing target requests a metadata task to a metadata sharing service providing server;

FIG. 7 is a flowchart specifically illustrating a process of obtaining a task event for metadata in step S140 of FIG. 3;

DETAILED DESCRIPTION

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

Hereinafter, some embodiments of the present invention will be described in detail with reference to the accompanying drawings.

Figure 1:
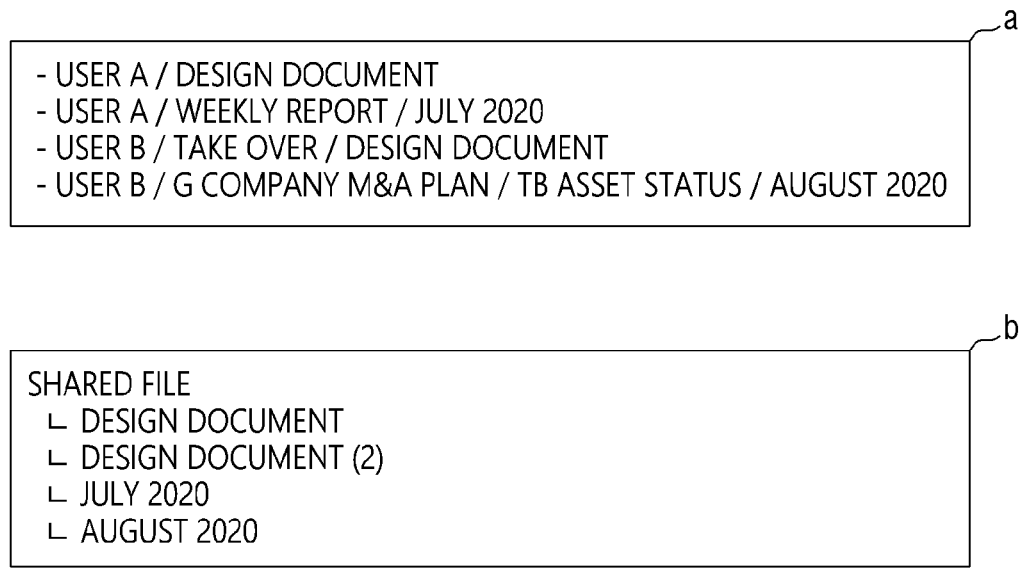
FIG. 1 is a diagram for describing a problem according to a conventional data sharing service.
Figure 2:
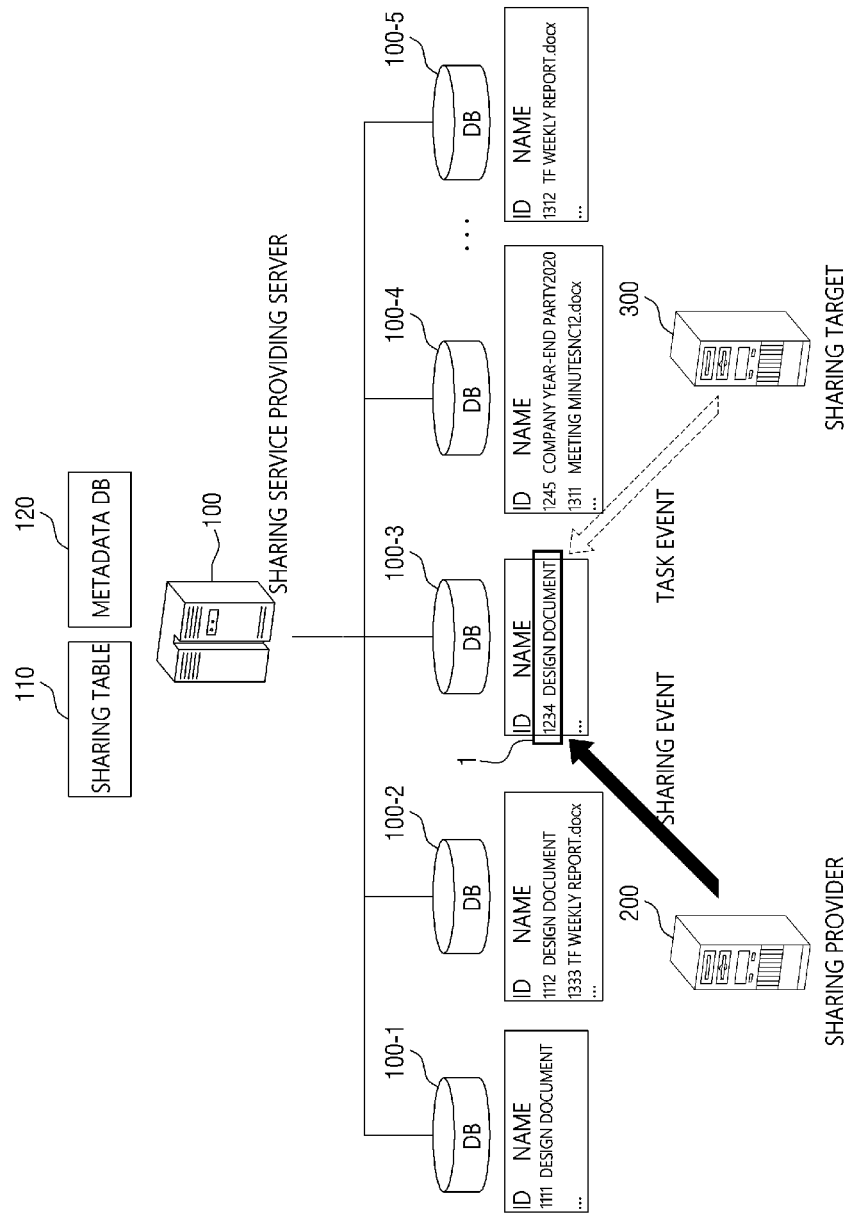
FIG. 2 is an exemplary diagram of a system for providing a metadata sharing service according to an embodiment of the present invention.

FIG. 2 is an exemplary diagram of a system for providing a metadata sharing service according to an embodiment of the present invention.

Referring to FIG. 2, the metadata sharing service providing system according to the present embodiment may include a sharing service providing server 100, a sharing provider 200, and a sharing target 300. The metadata sharing service providing system may provide a service for sharing metadata such as folders or files between client terminals that uses a virtual drive environment for access. In the present specification, metadata means data included in a folder or file, but is not limited thereto.

The sharing service providing server 100 may obtain a sharing event from the sharing provider 200, and provide metadata corresponding to the sharing event requested by the sharing provider 200 to the sharing target 300.

Here, the sharing provider 200 and the sharing target 300 are client terminals accessing the sharing service providing server 100, and may include a smart phone, a laptop computer, a digital broadcasting terminal, personal digital assistants (PDA), a portable multimedia player (PMP), navigation, a slate PC, a tablet PC, a wearable device, for example, a watch-type terminal (smartwatch), etc. The function execution apparatus of the present invention is not limited to the above-listed examples.

The sharing service providing server 100 may provide metadata to the sharing provider 200 and the sharing target 300 by accessing metadata distributed and managed in a plurality of shards 100-1 to 100-5. In this case, the sharing service providing server 100 may provide metadata to the sharing provider 200 and the sharing target 300 through the virtual drive environment.

For example, metadata may be distributed and stored in a plurality of shards 100-1 to 100-5, respectively, and when requested to share or use the corresponding metadata, the sharing service providing server 100 may access the corresponding shards, and provide the operation of sharing or task by providing the identification ID of the corresponding metadata.

Specifically, as shown in FIG. 2, the sharing service providing server 100 may receive a request for a sharing event for the metadata of the folder 1 called 'design document' stored in the shard from the sharing provider 200, and register the sharing event in the sharing table 110. The sharing service providing server 100 may collectively manage currently shared information using information registered in the sharing table 110.

The sharing service providing server 100 may provide the shared 'design document' folder 1 to the sharing target 300. The sharing target 300 may access the 'design document' folder 1 using a virtual drive environment. The sharing target 300 may transmit a task event to the sharing service providing server 100 in order to perform a task on the 'design document' folder 1.

The sharing service providing server 100 may identify the metadata desiring a task by using the task event received from the sharing target 300, and determine, in which shard the corresponding metadata is located among a plurality of shards 100-1 to 100-5. Further, it may search the path of the metadata in the corresponding shard by using the metadata DB 120, and provide the task operation using the identification ID of the metadata.

The system for providing a metadata sharing service according to an embodiment of the present invention provides a virtual path for identifying the corresponding metadata without using the path name recognized by the OS as it is in order to avoid duplication of the name of the metadata. Accordingly, when requesting access to shared metadata from a client terminal, it is possible to prevent unnecessary disclosure of the upper folder and to search the metadata stored in the server at a faster speed.

So far, the configuration of the metadata sharing service providing system according to an embodiment of the present invention has been schematically described with reference to FIG. 2. Hereinafter, a method of providing a metadata sharing service according to an embodiment of the present invention will be described with reference to FIGS. 3 to 10. This embodiment may be performed by a computing device. For example, the computing device may be the sharing service providing server 100 described with reference to FIG. 2. In describing the present embodiment, descriptions of subjects performing some operations may be omitted. In this case, the performing subject is the computing device.

Figure 3:
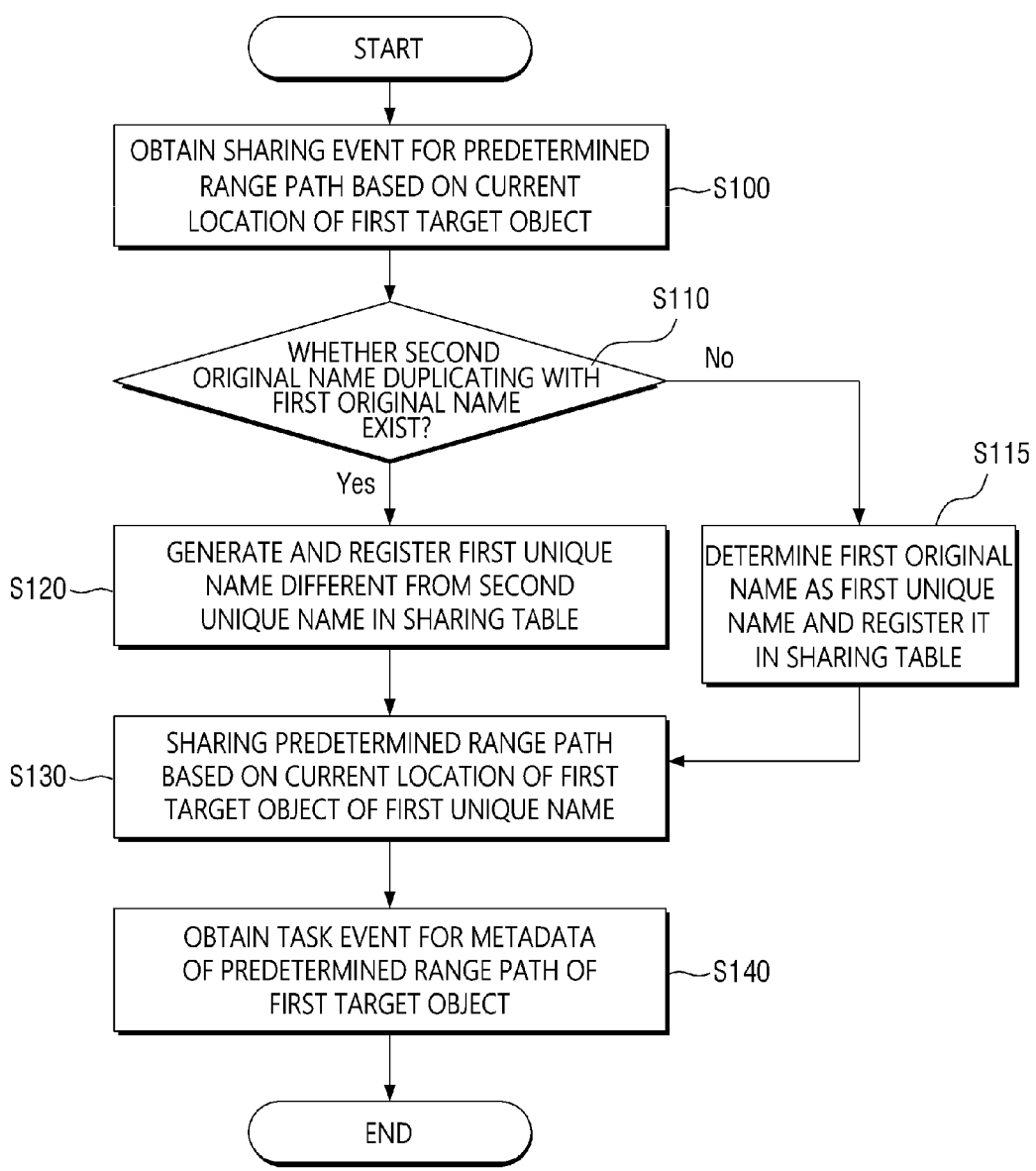
FIG. 3 is a flowchart of a method for providing a metadata sharing service according to an embodiment of the present invention.

FIG. 3 is a flowchart of a method for providing a metadata sharing service according to an embodiment of the present invention.

In step S100 of FIG. 3, a sharing event for a predetermined range path based on the current location of the first target object may be obtained. In this case, the sharing of the target object, to which the permission is granted by the sharing provider 200 requesting the sharing event, may be requested. Here, the target object, to which the permission is granted, may mean a folder or file set by the sharing provider 200 or a folder or file, in which security is previously set, but is not limited thereto.

In this specification, a target object may mean a folder or a file. The first target object may be a first folder or a first file to be shared according to a sharing event.

In an embodiment, the folder, to which the permission is granted, may mean a first target object corresponding to a sharing event and a folder at a lower level of the first target object. For example, when a sharing event of a file called "design document" is requested from the sharing provider 200, the path of the upper folder of "design document" is not shared, and the path to the folder of "design document" and the path for the subfolder of "design document" may be shared In step S110, it may be determined whether the name of shared metadata is duplicated. In this step, it may be determined whether the name of shared metadata is duplicated using the sharing table 110 for managing the sharing target object. The data structure of the sharing table 110 will be described with reference to FIG. 4.

FIG. 4 is a diagram for describing an example of a sharing table 110, in which various types of information of metadata are recorded to provide a metadata sharing service.

Figure 9:
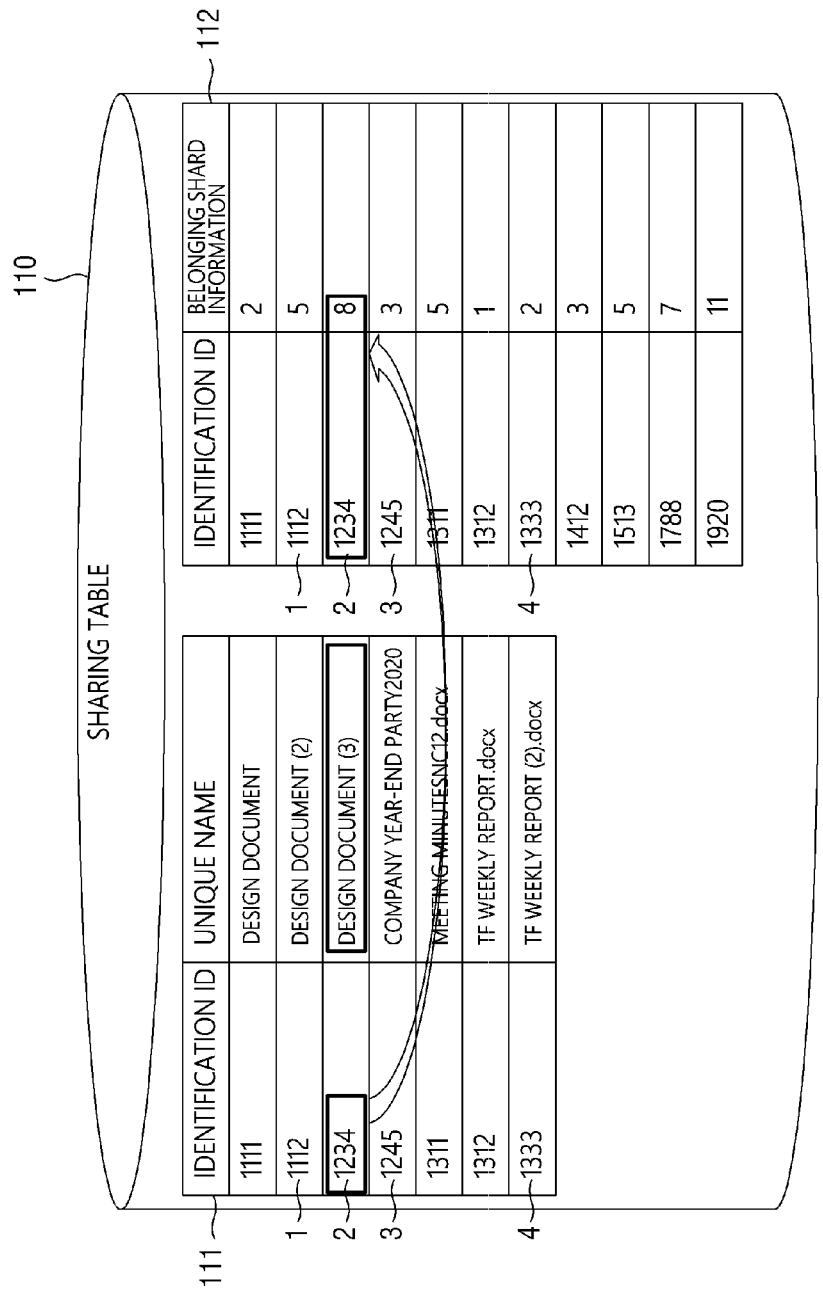
FIG. 9 is a diagram for describing a process of tracking a shard, to which metadata belongs, using a unique name in a sharing table.

The sharing table 110 may include a first sharing table 111 according to an embodiment, and the second sharing table 112 will be described with reference to FIG. 9. On the other hand, the sharing table 110 is not divided into the first sharing table 111 and the second sharing table 112, but may consist of one table, and it should be noted that it is not limiting the number of the sharing table 110 or placing an excessive meaning on it.

The first sharing table 111 of FIG. 4 may include an identification ID 11, an original name 12, and a unique name 13 of a file or folder, and the number of duplicate cases 14. The identification ID 11 is a number or symbol that can identify each metadata. The original name 12 means the original name 12 originally owned by the metadata to be shared by the sharing provider 200. That is, the original name 12 may mean the name of a folder displayed in the OS of the sharing provider 200.

The unique name 13 is a unique name generated to avoid confusion due to duplication when duplicating with the original name 12 previously stored in the first sharing table 111. Such a unique name 13 may be generated based on the number of duplicate cases 14.

For example, the original name 12 "design document" is already registered with the identification ID 11 of "1111." Since the same original name 12 did not exist at the time of registering the design document of the identification ID 11 of "1111," the number of duplicate cases 14 was set to 1, and the unique name 13 was registered as "design document," which is the same as the original name 12.

When registering the original name 12 of "design document" of the identification ID 11 of "1112" in the first sharing table 111 (that is, when sharing of "design document" is requested), the "design document" of identification ID 11 of "1111" was already registered at the time of the registration. Therefore, the number of duplicate cases 14 was set to 2, and the unique name 13 was registered as a "design document (2)" (1) in order to avoid duplication with the "design document" of the identification ID 11 of "1111."

When registering the original name 12 "design document" of the identification ID 11 of "1234" in the first sharing table 111 (that is, when sharing of the "design document" is requested), "design document" of the identification ID 11 of "1111" and "design document" of identification ID 11 of "1112" were already registered at the time of registration. Therefore, the number of duplicate cases 14 was set to 3, and the unique name 13 was registered as "design document (3)" to avoid duplication with "design document" of identification ID 11 of "1111" and "design document" of identification ID 11 of "1112."

As for the original name 12 "company year-end party 2020" of the identification ID 11 of "1245," since the same original name 12 did not exist at the time of registration, the number of duplicate cases 14 was set to 1, and the unique name 13 was registered as "design document," which is the same as the original name.

Similarly, as for the original name 12 "TF weekly report.docx" of the identification ID 11 of "1333," since the original name 12 "TF weekly report.docx" of the identification ID 11 of "1312" was already registered at the time of registration, the number of duplicate cases 14 was set to 2, and the unique name 13 was registered as "TF weekly report (2).docx" to avoid duplication with "TF weekly report.docx" of identification ID 11 of 1312 (4). Here, "TF weekly report.docx" is metadata consisting of files. That is, the metadata may consist of various data regardless of a folder or file format.

The sharing table 110 may generate a unique name 13 based on whether or not the shared file or folder is duplicated as described above to manage information on sharing of metadata. The metadata registered in the sharing table 110 may be treated as the shareable metadata.

Referring to FIG. 3 again, in step S110, it may be determined whether the second original name of the second folder previously registered with a name duplicating with the first original name of the first target object according to the sharing event exists in the sharing table 110. If it does not exist, it may be registered in the sharing table 110 by determining the first original name as the first unique name in step S115.

If the second original name of the second target object previously registered with a name duplicating with the first original name of the first target object exists, in step S120, the first unique name different from the second unique name for the second original name of the second target object may be generated, and the first unique name may be registered in the sharing table 110. The second target object may mean a second folder or a second file previously registered in the sharing table.

Then in step S130, a predetermined range path based on the current location of the first target object of the first unique name may be shared according to the sharing event through the virtual drive, and the shared predetermined range path may be provided to the sharing target 300.

Hereinafter, a predetermined range path of metadata provided to the sharing target 300 will be described with reference to FIG. 5. FIG. 5 is a diagram for describing an example of metadata received by the sharing target 300 from the sharing provider 200 through a virtual drive.

The sharing target 300 may access the virtual drive environment called "Sharing Service" by using the explorer, and receive metadata shared from the sharing provider 200 in the "shared files" folder, which is a subfolder thereof. Since the original name of the "design document" of the identification ID "1112" and the "design document" of the identification ID "1234" are the same as the original name stored in the shared table 110 in FIG. 4, they may be displayed with the unique names "design document (2)" and "design document (3)" (1 and 2). "Company year-end party 2020" can be displayed as "company year-end party 2020" as it is (3) since there is no duplicate name.

In addition, the original name "TF weekly report.docx" of ID 1333 can be displayed with the unique name "TF weekly report (2).docx" (4) since the original name "TF weekly report.docx" of the identification ID 1312 was already registered at the time of registration.

The metadata 1 to 4 received by the current sharing target 300 are design document (2), design document (3), company year-end party 2020, and TF weekly report (2).docx.

Regardless of whether other duplicated original names are shared by the same sharing provider 200, it may be provided to the sharing target 300 by using a different unique name for the duplicated original name among the metadata provided by the sharing service providing server 100.

That is, in the present embodiment, as long as the original name of any one of the metadata distributed and managed in a plurality of shards is the same, it is managed with a different unique name.

Accordingly, in the method of providing a metadata sharing service according to an embodiment of the present invention, even if any sharing provider 200 requests to share metadata with the same original name, it is possible to prevent from displaying a duplicate name to the sharing target 300.

In step S140, it is possible to obtain a request event of a task by the sharing target 300 from among the provided predetermined range path. That is, the task of the metadata located in a predetermined range path may be requested by the sharing target 300. Information on a task event, in which a task of metadata is requested, will be described with reference to FIG. 6.

FIG. 6 is a diagram for describing an example of a task event 310, in which a sharing target 300 requests a task of metadata to the metadata sharing service providing server 100.

The sharing target 300 may perform an inquiry task, modification task, deletion task, or execution task on the metadata for the shared metadata. The task event 310 is exemplary and not limited thereto.

The task event 310 may include a unique name, a sub-folder and file path, a server request, and a full path value requested to the server. The unique name may be the same as the unique name displayed to the task target.

As for "design document (2)," "delete" task was requested (1) as a server request task. The full path value requested to the server is the same as the shared "design document (2)" folder. That is, the task event 310 for deleting the "design document (2)" of FIG. 5 is generated.

As for the "design document (3)," the "rename" operation was requested (2) as a server request task. The full path value requested to the server is the "mobile/iPhone/user registration" folder that exists lower than the shared "design document (3)" folder. That is, the task event 310 of performing the "rename" of the "user registration" folder is generated while reaching the "iPhone" folder by clicking the "design document (3)" of FIG. 5 and following the sub-folder.

Similarly, as for "company year-end party 2020," "sub-list inquiry" operation was requested (3) as a server request task. The full path value requested to the server is "contact.xlsx" in the "TF member" folder that exists lower than the shared "company year-end party 2020" folder. That is, the task event 310 of performing "sub-list inquiry" of the "contact.xlsx" file is generated while reaching the "TF member" folder by clicking "company year-end party 2020" in FIG. 5 and following the subfolder.

As for "TF weekly report (2).docx," "open" operation was requested (4) as a server request task. The full path value requested to the server is the same as the shared folder "contact.xlsx." That is, the task event 310 for performing "opening" of "TF weekly report (2).docx" of FIG. 5 is generated.

As shown in FIG. 6, the task event 310 is information generated by the sharing target 300, and the sharing target 300 cannot check the upper folder of the shared metadata, but can check only the subfolder. Accordingly, even in the task event 310, information on the upper folder is not included and only information on the subfolder is included.

Hereinafter, a detailed method for efficiently accessing metadata distributed and managed across a plurality of shards without knowing the upper folder of the metadata will be described with reference to FIGS. 7 to 10.

Figure 8:
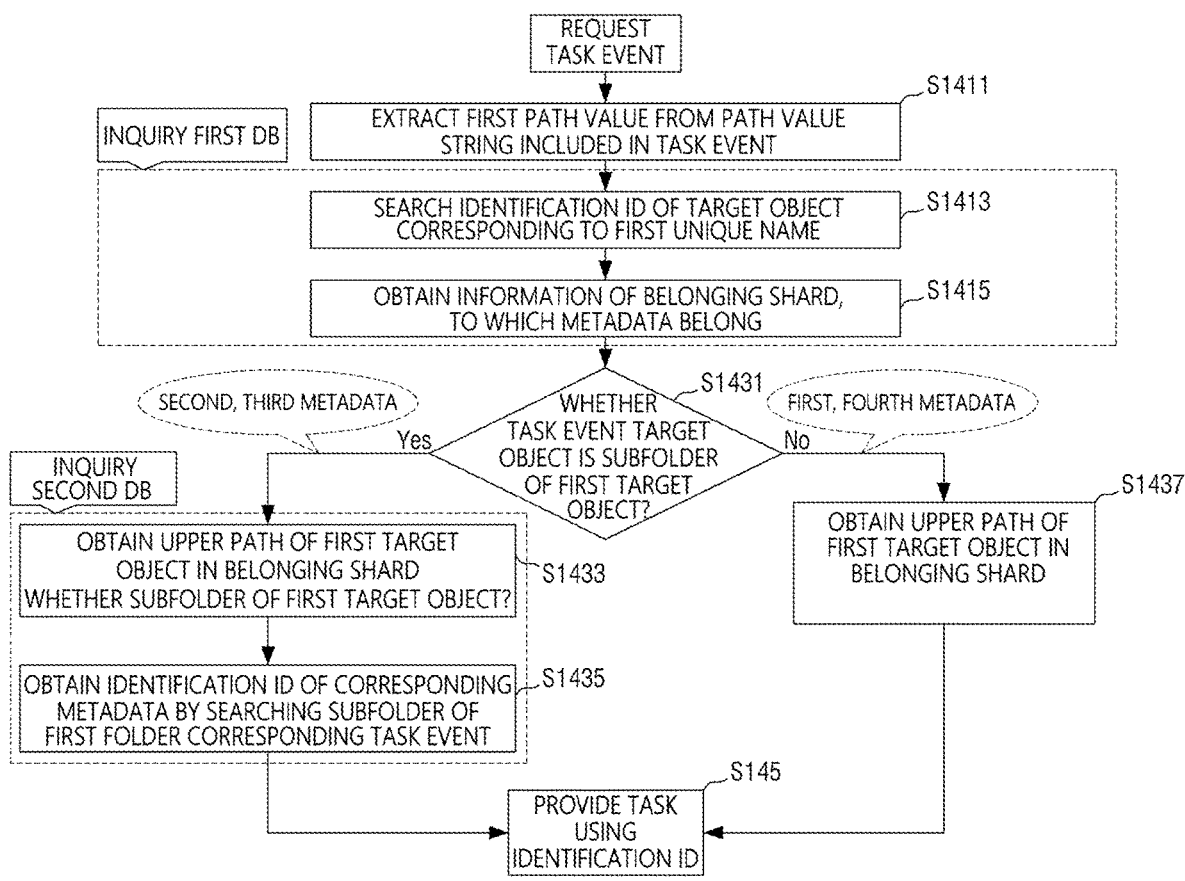
FIG. 8 is a flowchart for describing steps S141 to S145 of FIG. 7 in more detail.

FIG. 7 is a flowchart for specifically describing a process of obtaining a task event for metadata in step S140 of FIG. 3, and FIG. 8 is a flowchart for describing steps S141 to S145 of FIG. 7 in more detail.

In step S140 of FIG. 3, steps S141 to S145 may be performed when a task event for metadata is obtained from the sharing target 300.

In step S141, a belonging shard, to which metadata corresponding to the task event belongs, may be searched with reference to the sharing table 110. Thereafter, in step S143, with reference to the metadata DB 120, the full path of the metadata corresponding to the task event and the identification ID for the full path may be searched within the belonging shard. The metadata DB 120 is a database that manages various information about folders and files stored in a plurality of shards. The identification ID of the metadata corresponding to the task event may be finally searched using the metadata DB 120. Thereafter, the task of the metadata may be provided to the sharing target 300 using the identification ID for the full path in step S145.

More specifically, when a task event is requested in FIG. 7, a first path value may be extracted from a path value string included in the task event in step S1411. For example, the path value string may consist of information such as "design document (3)/mobile/iPhone/user registration" of FIG. 6, where "design document (3)," which is the first path value, may be extracted.

In step S1413, the first unique name of the target object corresponding to the first path value may be searched in the first sharing table 111. As shown in FIG. 9, the sharing table 110 may include a first sharing table 111 and a second sharing table 112, and the first sharing table 111 stores a unique name.

"Design document (3)," which is the first path value extracted in the previous step, may be searched (2) in the first sharing table 111, and "1234," which is an identification ID corresponding to "design document (3)," may be searched (2).

Thereafter, by searching the identification ID in the second sharing table 112, information on a belonging shard, to which metadata corresponding to a task event belongs, may be obtained. Here, the second sharing table 112 may include the identification ID of the file and the belonging shard information of the identification ID of the file. The identification ID searched in the first sharing table 111 is "1234," and by searching this in the second sharing table 112, information, in which the belonging shard information is "8," may be obtained.

At this time, although steps S1413 and S1415 are two operations, they may be performed as one operation by performing in a unified sequence using a join syntax depending on implementation.

Thereafter, in step S1431, it may be determined whether the target object corresponding to the metadata corresponding to the task event is a subfolder of the first target object. That is, the uppermost folder provided to the sharing target 300 is a first target object, the first target object may include a subfolder, and metadata, for which the sharing target 300 requests a task, may be a subfolder of the first target object, or a file located in the subfolder.

If the task event target object is not a subfolder of the first target object, it is determined that the task event target object is the first target object, and the identification ID of the first target object may be obtained by step S1437, and the task may be provided using the identification ID of the first target object obtained in step S145.

If the target object corresponding to the task event is a subfolder of the first folder, steps S1433 and S1435 may be performed.

In step S1433, the upper path of the first folder in the belonging shard may be obtained. Specifically, as shown in FIG. 10, the metadata DB 120 may include an identification ID, an original name, a name based full path, and a shard key.

Figure 10:
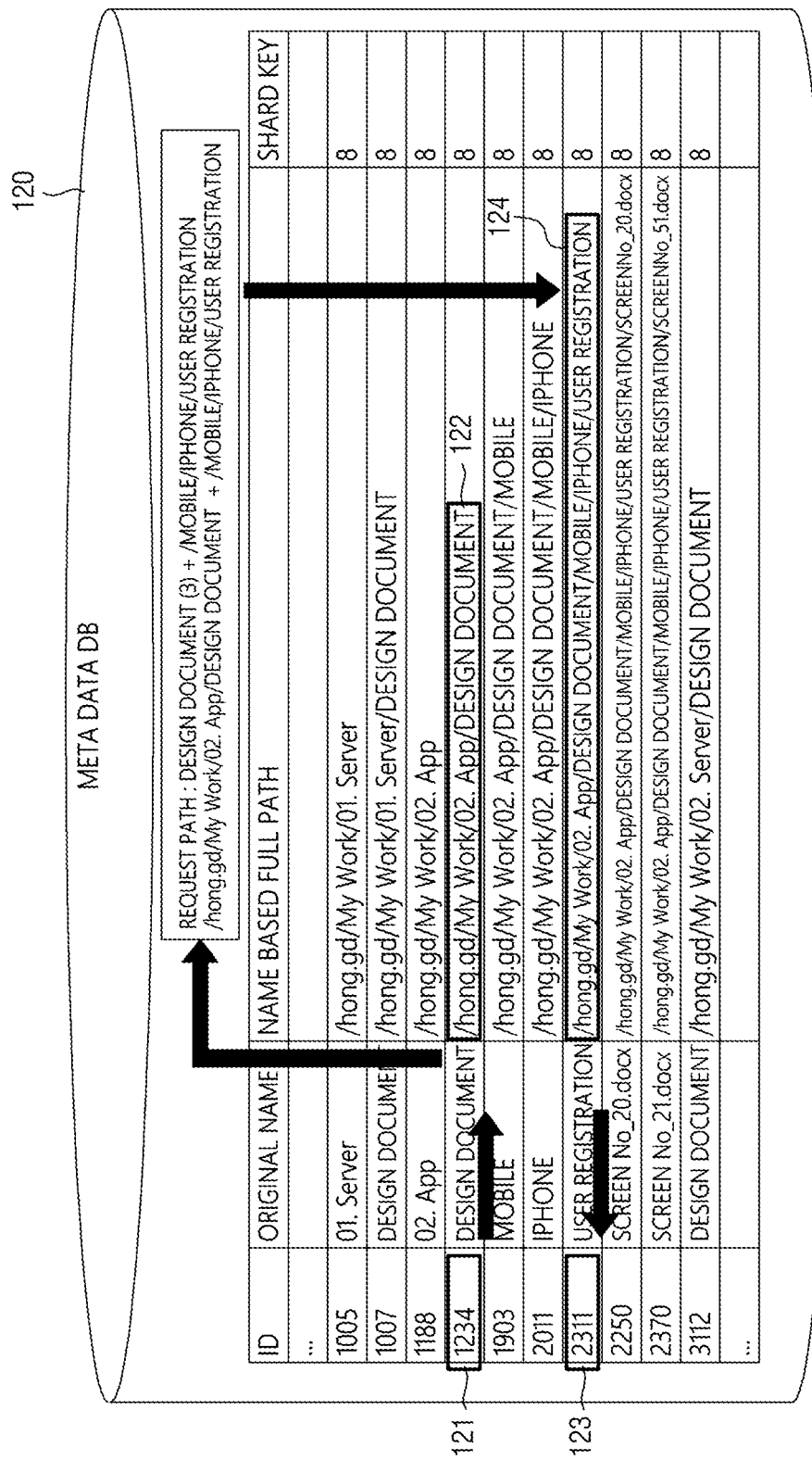
FIG. 10 is a diagram for describing a process of obtaining a corresponding identification ID by tracking an upper path and a lower path of the corresponding meta data in the metadata DB that manages the belonging shard.

The shard key 8 of the metadata DB 120 of FIG. 10 is referenced using the belonging shard information obtained in step S1415, and the path 122 of the upper folder of the "design document" of the "8" shard may be obtained by using the identification ID "1234" of metadata 121 of "design document (3)." That is, using the identification ID in the metadata DB 120 corresponding to the belonging shard, the upper path 122 corresponding to the range, to which the permission is not granted based on the current location of the first folder, may be obtained.

This upper path is not disclosed because it is not shared with the sharing target 300, but the upper path may be obtained to access the corresponding shard for the task of the metadata by referring to the metadata DB 120.

In step S1435, a subfolder of the first folder included in the task event ("full path value requested to the server" in FIG. 6) may be searched, and an identification ID 123 for the subfolder may be obtained. That is, an identification ID 123 may be obtained using the path 124 of the subfolder of FIG. 10.

At this time, although steps S1433 and S1435 are two operations, they may be performed as one operation by being performed in a unified sequence using a join syntax depending on implementation.

The identification ID 123 for such a subfolder may be a folder or file requested by the sharing target 300 to perform a task.

As such, in the method of providing a metadata sharing service according to an embodiment of the present invention, even if sharing is provided without disclosing the upper folder, it is possible to easily search to which shard the folder belongs, in which a task was performed when performing the task later, and since the sharing table 110 and the metadata DB 120 are used, the task can be completed with only two constant time complexity, which has the advantage of reducing time and cost. In addition, in this method, the sharing table 110 is used to solve the problem of name duplication that may occur when only the subfolders are disclosed without disclosing the upper folder, so that even if the folder has the same name, it can be managed without confusion.

Figure 11:
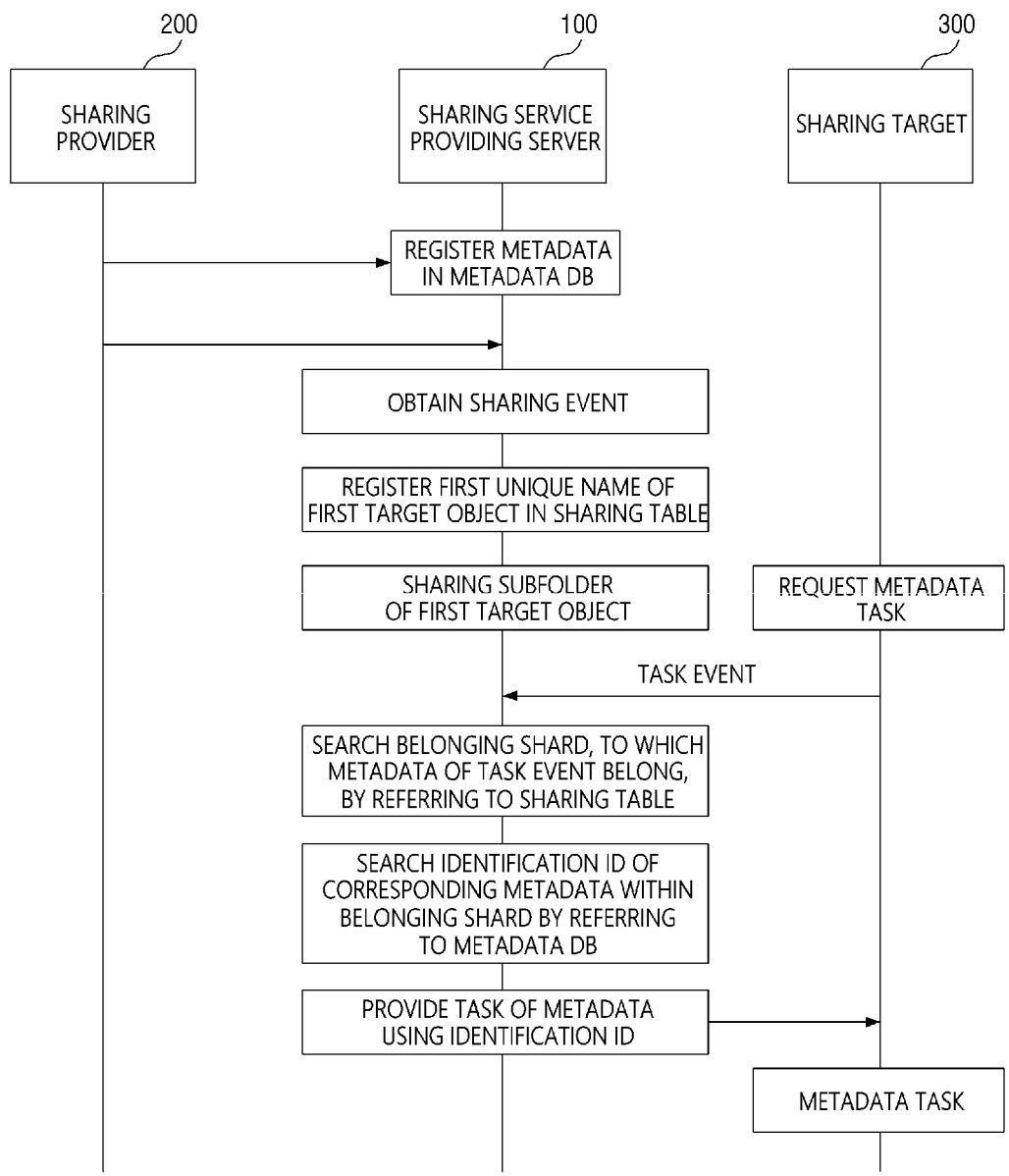
FIG. 11 is a system flowchart of a method for providing a metadata sharing service according to an embodiment of the present invention.

FIG. 11 is a system flowchart of a method for providing a metadata sharing service according to an embodiment of the present invention.

Referring to FIG. 11, the sharing provider 200 may transmit metadata to the sharing service providing server 100 whenever generating and managing the metadata. The sharing service providing server 100 may input the content of the changed metadata into the metadata DB 120. If the sharing service providing server 100 obtains a sharing event for metadata from the sharing provider 200, it may register the first unique name of the first target object in the sharing table 110. In this case, if the second original name having the same name as the first original name already exists in the sharing table 110, the first unique name different from the second unique name may be registered in the sharing table 110. The sharing service providing server 100 may share the first target object and a subfolder of the first target object with the sharing target 300.

Thereafter, when the sharing service providing server 100 receives a task event for the metadata of the first target object shared from the sharing target 300 and the subfolder of the first target object, the sharing service providing server 100 may search for a belonging shard, to which the metadata of the task event belongs, with reference to the metadata table 110. Thereafter, the sharing service providing server 100 may search for the identification ID of the corresponding metadata within the belonging shard with reference to the metadata DB 120, and provide the task of metadata to the sharing target 300 using the identification ID.

The sharing target 300 may receive a task for metadata from the sharing service providing server 100 in a virtual drive environment.

In the method of providing a metadata sharing service according to an embodiment of the present invention, even in a DB structure, in which a large amount of data is divided into several shards using a shard key and managed, the identification ID of the metadata can be found from the virtual path name with the same search within 2 times, and thus it is possible to search and process the object for the client's request with the lowest cost and the lowest time.

So far, the method for providing the metadata sharing service described in the present specification has been described with reference to FIGS. 2 to 11.

Figure 12:
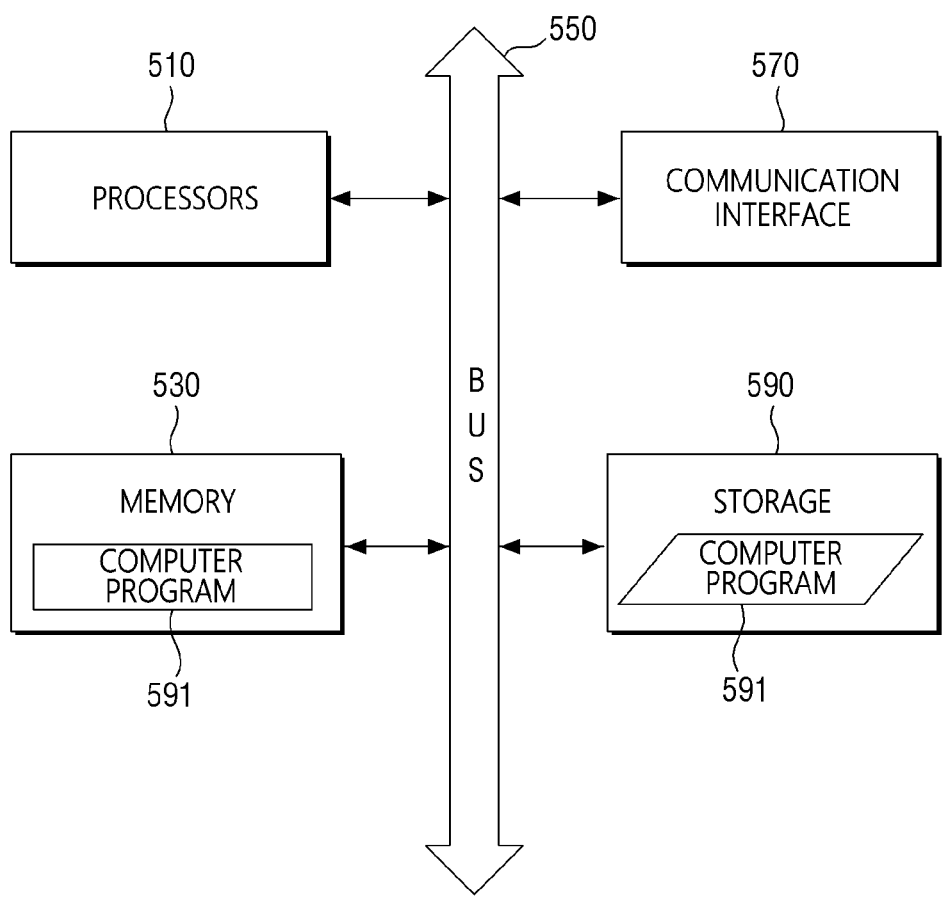
FIG. 12 is an example hardware diagram illustrating a computing device.

FIG. 12 is an example hardware diagram illustrating a computing device 500.

As shown in FIG. 12 the computing device 500 may include one or more processors 510, a bus 550, a communication interface 570, a memory 530, which loads a computer program 591 executed by the processors 510, and a storage 590 for storing the computer program 591. However, FIG. 12 illustrates only the components related to the embodiment of the present disclosure. Therefore, it will be appreciated by those skilled in the art that the present disclosure may further include other general purpose components in addition to the components shown in FIG. 12.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. An example of the memory 530 may be a RAM, but is not limited thereto The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented. When the computer program 591 is loaded on the memory 530, the processor 510 may perform the methods/operations in accordance with various embodiments of the present disclosure by executing the one or more instructions In an embodiment the computer program comprises, an instruction for obtaining a sharing event for a predetermined range path based on a current location of a first target object, an instruction for determining whether a second original name of a second target object previously registered with a name duplicating with a first original name of the first target object according to the sharing event exists in a sharing table by using the sharing table for managing a sharing target object, an instruction for generating and registering a first unique name different from a second unique name for the second original name of the second target object in the sharing table in response to the existence of a second original name previously registered with a name duplicating with the first original name; and an instruction for sharing a predetermined range path based on a current location of a first target object of the first unique name according to the sharing event through a virtual drive.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

In the above description, it is described that all the components constituting the embodiments of the present disclosure are combined or operated as one, but the technical features of the present disclosure are not limited to these embodiments. That is, within the scope of the present disclosure, all of the components may be selectively combined and operated in one or more combinations.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method performed by a computing device for providing a metadata sharing service capable of sharing metadata without disclosing an upper path in a virtual drive environment, the method comprising:
obtaining a sharing event for a predetermined range path based on a current location of a first target object;
determining whether a second original name of a second target object previously registered with a name duplicating with a first original name of the first target object according to the sharing event exists in a sharing table by using the sharing table for managing a sharing object;
generating and registering a first unique name, of the first target object, different from a second unique name for the second original name of the second target object in the sharing table if the second original name previously registered with the name duplicating with the first original name exists, wherein the predetermined range path comprises the first unique name corresponding to the first original name and the second unique name corresponding to the second original name, wherein a first original file corresponding to the first unique name is located in a first shard of a first plurality of shards over a plurality of servers, and wherein the computing device manages the first plurality of shards stored in the plurality of servers;
sharing the predetermined range path based on the current location of the first target object with the first unique name according to the sharing event through a virtual drive;
receiving a request for a task event, wherein the task event comprises a unique name, a subfolder and file path, a server request, and a full path value; and
performing, in response to the request for the task event, a task operation, wherein the task operation comprises at least one of modifying a piece of data in a database, deleting the piece of data from the database, or executing the piece of data in the database.

2. The method of claim 1, wherein the first target object is a first folder or a first file to be shared according to the sharing event,
wherein the second target object is a second folder or a second file previously registered in the sharing table.

3. The method of claim 2, wherein the obtaining of the sharing event comprises:
distributing and managing metadata for a folder and a file in the first plurality of shards, and accessing the metadata through the virtual drive by a sharing provider requesting the sharing event.

4. The method of claim 2, wherein the sharing table comprises:
a first sharing table comprising an identification identifier (ID), an original name, and a unique name of a folder or a file, and the number of duplication of an original name; and
a second sharing table comprising an identification ID of the folder or the file, and belonging shard information of the identification ID.

5. The method of claim 4, wherein the unique name of the folder or the file of the first sharing table is generated by adding a tag to the same name as the original name of the folder or the file if the original name of the folder or the file exists, based on whether the original name of the folder or the file is duplicated.

6. The method of claim 2, wherein the obtaining of the sharing event comprises:
receiving a request to share a target object, to which permission is granted, by a sharing provider requesting the sharing event.

7. The method of claim 6, wherein the receiving of the request to share the target object, to which the permission is granted, comprises:
receiving the request to share the target object corresponding to the sharing event and a subfolder of the target object.

8. The method of claim 2, further comprising:
receiving the request for the task event for metadata of a predetermined range folder from a sharing target who has received the predetermined range folder based on a current location of a target object.

9. The method of claim 8, wherein the task event further comprises an inquiry task, wherein the inquiry task identifies a file or folder lower in a file structure than the first target object.

10. The method of claim 8, wherein the receiving of the request for the task event comprises:
searching for a belonging shard, to which the metadata corresponding to the task event belongs, by referring to the sharing table;
searching for a full path of the metadata corresponding to the task event and an identification identifier (ID) for the full path within the belonging shard by referring to a metadata database (DB) for managing metadata for a folder and a file stored in a plurality of shards; and
providing a task of the metadata to the sharing target by using the identification ID for the full path.

11. The method of claim 10, wherein the metadata DB includes the identification ID of the metadata, a name of the metadata, the full path based on the name of the metadata, and a shard key of the belonging shard, to which the metadata belongs.

12. The method of claim 10, wherein the searching for the belonging shard comprises:
extracting a first path value from a path value string included in the task event;
searching for a first unique name corresponding to the first path value in a first sharing table, and searching for an identification ID of a folder corresponding to the first unique name; and
searching for the identification ID in a second sharing table to obtain information on the belonging shard, to which metadata corresponding to the task event belongs.

13. The method of claim 10, wherein the searching for the belonging shard comprises:
performing in a unified sequence using a join syntax.

14. The method of claim 10, wherein the searching for the full path of the metadata corresponding to the task event and the identification ID for the full path within the belonging shard comprises:
obtaining an upper path corresponding to a range, to which permission is not granted, based on the current location of the target object by using the identification ID in the metadata DB corresponding to the belonging shard.

15. The method of claim 14, wherein the searching for the full path of the metadata corresponding to the task event and the identification ID for the full path within the belonging shard comprises:

determining whether the target object corresponding to the metadata corresponding to the task event is located in a subfolder of the first target object; and searching for the metadata corresponding to the task event by following the subfolder to obtain an identification ID for the metadata if the target object corresponding to the metadata corresponding to the task event is located in the subfolder of the first target object.

16. The method of claim 15, wherein the searching for the full path of the metadata corresponding to the task event and the identification ID for the full path within the belonging shard comprises:

performing in a unified sequence using a join syntax.

17. An apparatus for providing a metadata sharing service capable of sharing metadata without disclosing an upper path in a virtual drive environment, the apparatus comprising:

a processor;

a network interface;

a memory executed by the processor for loading a computer program; and a storage for storing the computer program, wherein the computer program comprises:

an instruction for obtaining a sharing event for a predetermined range path based on a current location of a first target object;

an instruction for determining whether a second original name of a second target object previously registered with a name duplicating with a first original name of the first target object according to the sharing event exists in a sharing table by using the sharing table for managing a sharing target object;

an instruction for generating and registering a first unique name of the first target object different from a second unique name for the second original name of the second target object in the sharing table if the second original name previously registered with the name duplicating with the first original name exists;

an instruction for sharing the predetermined range path based on the current location of the first target object with the first unique name according to the sharing event through a virtual drive, wherein the predetermined range path comprises the first unique name corresponding to the first original name and the second unique name corresponding to the second original name, wherein a first original file corresponding to the first unique name is located in a first shard of a first plurality of shards over a plurality of servers, and wherein the apparatus manages the first plurality of shards stored in the plurality of servers;

an instruction for receiving a request for a task event, wherein the task event comprises a unique name, a subfolder and file path, a server request, and a full path value; and an instruction for performing, in response to the request for the task event, a task operation, wherein the task operation comprises at least one of modifying a piece of data in a database, deleting the piece of data from the database, or executing the piece of data in the database.

18. The apparatus of claim 17, wherein the first target object is a first folder or a first file to be shared according to the sharing event, wherein the second target object is a second folder or a second file previously registered in the sharing table.

19. The apparatus of claim 18, wherein the computer program further comprises:

an instruction for receiving the request for the task event for metadata of a predetermined range folder from a sharing target who has received the predetermined range folder based on the current location of the first target object, wherein the instruction for receiving the request for the task event comprises:

an instruction for searching for a belonging shard, to which the metadata corresponding to the task event belongs, by referring to the sharing table;

an instruction for searching for a full path of metadata corresponding to the task event and an identification identifier (ID) for the full path within the belonging shard by referring to a metadata database (DB) for managing metadata for a folder and file stored in a plurality of shards; and an instruction for providing a task of the metadata to the sharing target by using an identification ID for the full path.

* * * * *